(12) United States Patent
Chen et al.

(10) Patent No.: US 12,523,411 B2
(45) Date of Patent: Jan. 13, 2026

(54) REFRIGERATING AND FREEZING DEVICE AND AGING DEVICE THEREOF

(71) Applicants: QINGDAO HAIER REFRIGERATOR CO., LTD., Shandong (CN); HAIER SMART HOME CO., LTD., Shandong (CN)

(72) Inventors: Tong Chen, Shandong (CN); Haoquan Liu, Shandong (CN); Zhanpeng Cui, Shandong (CN); Chunli Wang, Shandong (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 110 days.

(21) Appl. No.: 18/707,716

(22) PCT Filed: Nov. 2, 2022

(86) PCT No.: PCT/CN2022/129273
§ 371 (c)(1),
(2) Date: May 6, 2024

(87) PCT Pub. No.: WO2023/078300
PCT Pub. Date: May 11, 2023

(65) Prior Publication Data
US 2025/0003666 A1    Jan. 2, 2025

(30) Foreign Application Priority Data

Nov. 8, 2021    (CN) .......................... 202111315305.8

(51) Int. Cl.
*F25D 17/06*    (2006.01)
*A23B 2/80*    (2025.01)

(52) U.S. Cl.
CPC ................ *F25D 17/06* (2013.01); *A23B 2/80* (2025.01); *F25D 2323/00267* (2013.01); *F25D 2323/00284* (2013.01)

(58) Field of Classification Search
CPC ........... F25D 17/06; F25D 2323/00267; F25D 2323/00284; F25D 2317/061; F25D 23/12;
(Continued)

(56) References Cited

U.S. PATENT DOCUMENTS

| 6,295,820 B1 | 10/2001 | Cauchy et al. |
| 2008/0127669 A1 | 6/2008 | Visnjic et al. |
| 2022/0120488 A1* | 4/2022 | Roper et al. .......... F25D 25/025 |

FOREIGN PATENT DOCUMENTS

| CN | 104930781 A | 9/2015 |
| CN | 205245666 U | 5/2016 |

(Continued)

*Primary Examiner* — Jerry-Daryl Fletcher
*Assistant Examiner* — Dario Antonio Deleon
(74) *Attorney, Agent, or Firm* — MUNCY, GEISSLER, OLDS & LOWE, P.C.

(57) ABSTRACT

A refrigerating and freezing device and an aging device thereof. The aging device comprises: an inner housing defining an aging chamber; an outer housing, at least part of the circumferential side wall of the outer housing and at least part of the circumferential side wall of the inner housing being spaced apart to form an air supply channel, and the air supply channel being communicated with the aging chamber by means of a plurality of air supply ports disposed in the circumferential side wall of the inner housing; and a circulating fan, configured to controllably drive airflow in the air supply channel to flow to the aging chamber by means of the air supply ports. The plurality of air supply ports are arranged on the circumferential side wall of the inner housing in a manner of becoming gradually dense from top to bottom.

10 Claims, 4 Drawing Sheets

(58) Field of Classification Search
CPC ...... F25D 25/025; F25D 11/02; F25D 17/065;
A23B 2/80; A23B 4/06; A23L 13/70
See application file for complete search history.

(56) References Cited

FOREIGN PATENT DOCUMENTS

| | | | |
|---|---|---|---|
| CN | 107044762 | A | 8/2017 |
| CN | 109827375 | A | 5/2019 |
| CN | 110145913 | A | 8/2019 |
| CN | 113566473 | A | 10/2021 |
| JP | S59216540 | A | 12/1984 |
| JP | 201531499 | A | 2/2015 |
| JP | 2015135221 | A | 7/2015 |
| JP | 201913193 | A | 1/2019 |
| WO | WO2021129482 | A1 | 7/2021 |

* cited by examiner

REFRIGERATING AND FREEZING DEVICE AND AGING DEVICE THEREOF

CROSS-REFERENCE TO RELATED APPLICATIONS

The present application is a national phase entry of International Application No. PCT/CN2022/129273, filed Nov. 2, 2022, which claims priority to Chinese Patent Application No. 202111315305.8, filed Nov. 8, 2021, which are incorporated herein by reference in their entirety.

TECHNICAL FIELD

The present application belongs to the technical field of refrigeration and freezing technology, and more particularly relates to an aging device for use in a refrigerating and freezing device and the refrigerating and freezing device itself.

BACKGROUND

Aging refers to the process where acid-drained meat is placed in an aging chamber with controlled temperature, humidity, and airflow to slowly ferment naturally, eventually producing deeper flavors and enhancing the meat's tenderness, flavor, and juiciness. Existing aging devices are generally standalone, requiring specially designed temperature and humidity control devices, making them structurally complex. Furthermore, when objects to be aged are placed in the aging chamber, bottom sections of the objects usually come into contact with a shelf, and humidity of the bottom sections is relatively high. Inadequate airflow at the bottom can easily lead to excessive humidity, thereby promoting microbial growth and ultimately causing the objects to spoil and deteriorate.

Reference to any prior art in the specification is not, and should not be taken as, an acknowledgment or any form of suggestion that this prior art forms part of the common general knowledge in Europe or any other jurisdiction or that this prior art could reasonably be expected to be understood and regarded as relevant by a person skilled in the art.

SUMMARY

An object of the present application is to overcome at least one deficiency of the existing technology by providing an aging device for a refrigerating and freezing device that can prevent spoilage and deterioration of objects to be aged.

A further object of the present application is to improve a uniformity of airflow distribution throughout the aging chamber.

Another object of the application is to provide a refrigerating and freezing device comprising the aforementioned aging device.

According to the first aspect of the present application, the present application provides an aging device for a refrigerating and freezing device, for aging objects to be aged therein, comprising:
  an inner housing, defining an aging chamber inside for accommodating objects to be aged;
  an outer housing, disposed outside the inner housing, wherein at least part of a circumferential side wall of the outer housing is spaced apart from at least part of a circumferential side wall of the inner housing to form an air supply channel located outside the inner housing and inside the outer housing, the air supply channel communicates with the aging chamber through a plurality of air supply ports disposed in the circumferential side wall of the inner housing; and
  a circulating fan, configured to controllably drive airflow in the air supply channel through the air supply ports towards the aging chamber; wherein
  the plurality of air supply ports are arranged on the circumferential side wall of the inner housing in a manner of becoming gradually dense from top to bottom.

Further, the air supply ports comprise several vertical air supply ports extending vertically and several horizontal air supply ports extending horizontally; and the horizontal air supply ports are positioned in height below a middle portion and above a bottom portion of the lowest row of the vertical air supply ports.

Further, a grid placement rack is provided inside the inner housing for placing objects to be aged, the grid placement rack is spaced apart from a bottom plate of the inner housing; and a height of the horizontal air supply ports is approximately equal to or slightly lower than a height of the grid placement rack.

Further, a rear wall and two transverse side walls of the outer housing, and a rear wall and two transverse side walls of the inner housing are spaced apart respectively, to form the air supply channel being of U-shaped; the circulating fan is positioned in the air supply channel, and the plurality of air supply ports are defined on the two transverse side walls of the inner housing.

Further, the air supply channel comprises a first air supply section located behind the inner housing, a second air supply section and a third air supply section respectively formed on lateral sides of the inner housing;
  the circulating fan is located in the first air supply section, a return air port is provided on the rear wall of the inner housing, an air intake of the circulating fan is communicated with the return air port, and two opposite air outlets of the circulating fan are communicated with the second air supply section and the third air supply section.

Further, the second air supply section and the third air supply section are tapered along a direction of airflow inside them.

Further, guide plates are provided upstream of the second air supply section and the third air supply section, and the guide plates are located adjacent to some of the air supply ports on the outside.

Further, the return air port is a circular air port, a center of the return air port coincides with a center of the circulating fan, and a diameter of the return air port is ¾ to 1 times a diameter of the circulating fan; and/or
  a height of the air outlets of the circulating fan is ⅔ to 5/3 of the diameter of the circulating fan.

Further, the circulating fan comprises a volute and an impeller positioned in the volute, a top portion of the volute is an upwardly protruding arc-shaped structure.

According to the second aspect of the present application, the present application provides a refrigerating and freezing device, comprising:
  a cabinet, which defines a storage chamber for storing objects; and
  the aging devices for aging objects therein, the aging device being positioned in the storage chamber.

The aging device of the present application is applied to the refrigerating and freezing device and can effectively utilize the low-temperature and high-humidity environment inside the refrigerating and freezing device to promote aging of objects in the aging device, without the need for a dedicated temperature and humidity control device, thereby simplifying the structure of the aging device and reducing its cost. Additionally, the aging device of the present application comprises a double-shell structure with the inner housing and the outer housing, the aging chamber is defined in the inner housing, and the air supply channel is defined between the inner housing and the outer housing; driven by the circulating fan, the airflow in the air supply channel is directed to the aging chamber through air supply ports located on the circumferential side wall of the inner housing. Moreover, the air supply ports are arranged in a sparse-top, dense-bottom manner on the circumferential sidewall of the inner housing, meaning that the air supply ports at the top are sparsely distributed, and those at the bottom are densely arranged, thereby allowing more airflow into the lower part of the aging chamber to blow towards the bottom of the objects to be aged, and inhibiting microbial growth and reproduction, thereby preventing the objects from spoiling and deteriorating due to high bottom humidity.

Further, the air supply channel of the present application is formed between the rear wall and two transverse side walls of the outer housing and the rear wall and two transverse side walls of the inner housing, the air supply ports are defined on the two transverse side walls of the inner housing, thus the airflow in the air supply channel is sent to the aging chamber through the air supply ports on the lateral sides of the inner housing. In other words, the airflow from the two lateral sides of the inner housing into the aging chamber at the same time, thereby improving the uniformity of air supply across the aging chamber in a transverse direction, and improving the aging effect of the objects to be aged.

In further, the air supply channel comprises a first air supply section located on a rear side, a second air supply section and a third air supply section on lateral sides, the second air supply section and the third air supply section are tapered along a direction of airflow inside them, by using the way of gradually shrinking the airflow area, a phenomenon that the airflow velocity in the second air supply section and the third air supply section gradually decreases in the direction of airflow is avoided, and a uniformity of air supply in a longitudinal direction of the aging chamber is improved, and the uniform air blowing effect is ensured in each area of the surface of the longitudinal surface of the objects to be aged.

It can be seen that the objects to be aged can obtain uniform air blowing effect both horizontally and vertically, thereby improving the aging effect of the objects to be aged.

The above and other objects, advantages and features of the present application will become more apparent to those skilled in the art from the following detailed description of specific embodiments thereof taken in conjunction with the accompanying drawings.

As used herein, except where the context clearly requires otherwise, the term "comprise" and variations of the term, such as "comprising", "comprises" and "comprised", are not intended to exclude further features, components, integers or steps.

BRIEF DESCRIPTION OF DRAWINGS

Some specific embodiments of the application will be described in detail hereinafter by way of example and not by way of limitation with reference to the accompanying drawings. The same reference numerals identify the same or similar components or parts in the drawings. Those skilled in the art should appreciate that the drawings are not necessarily drawn to scale. In the drawings.

DETAILED DESCRIPTION OF EMBODIMENTS

This application initially provides an aging device for a refrigerating and freezing device, which is used for aging objects to be aged in it. In other words, the aging device of this application is applied to the refrigerating and freezing device and can effectively utilize the low temperature and high humidity environment in the refrigerating and freezing device to facilitate the aging of objects inside the aging device, thereby eliminating the need for dedicated temperature and humidity control devices, thus simplifying the structure of the aging device and reducing its cost.

Figure 1:
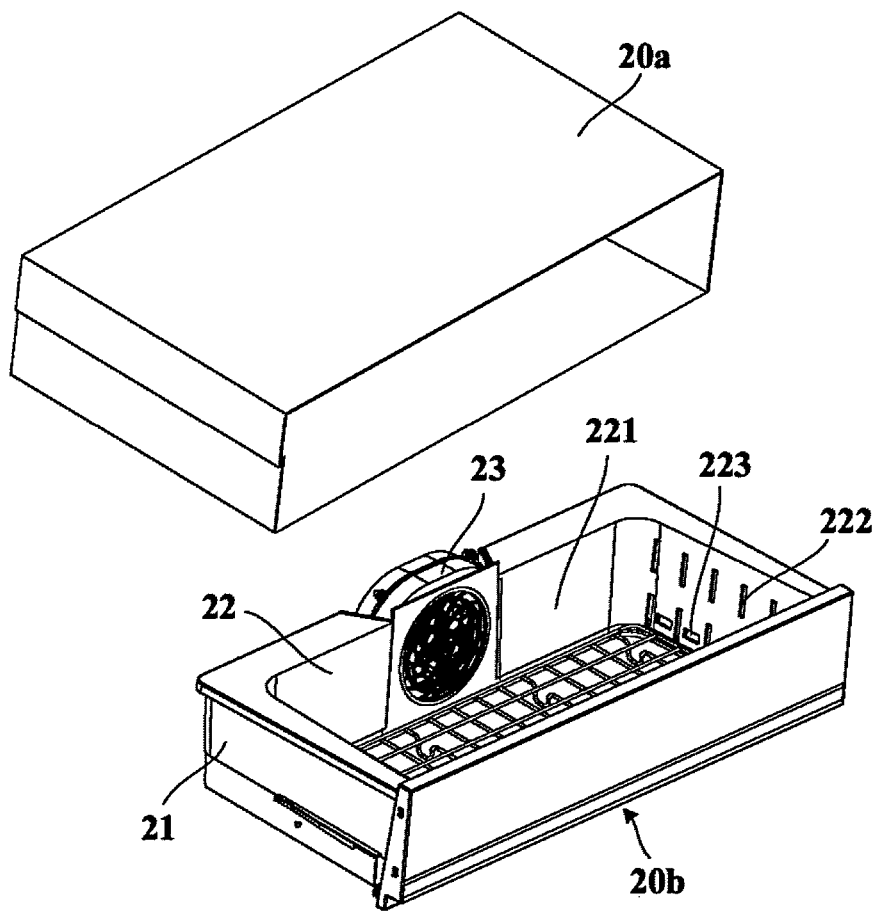
FIG. 1 is a schematic exploded view of an aging device according to an embodiment of the present application.
Figure 2:
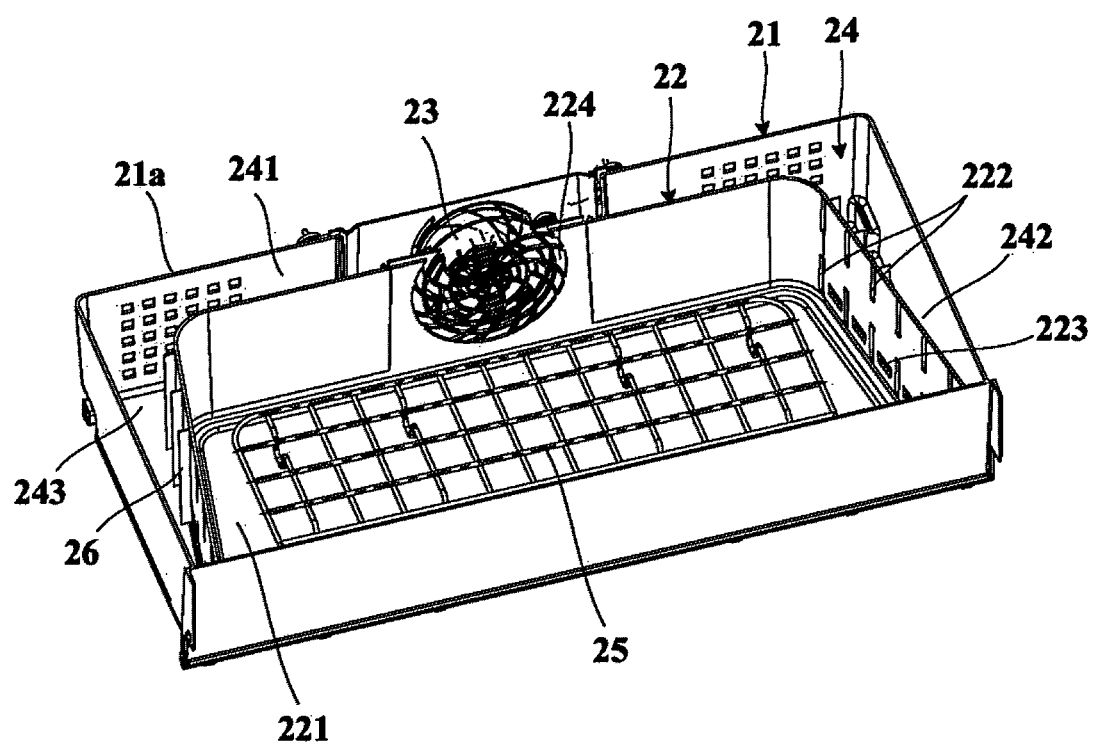
FIGS. 2-3 are schematic cross-sectional views of the aging device in different positions according to an embodiment of the present application.
Figure 3:
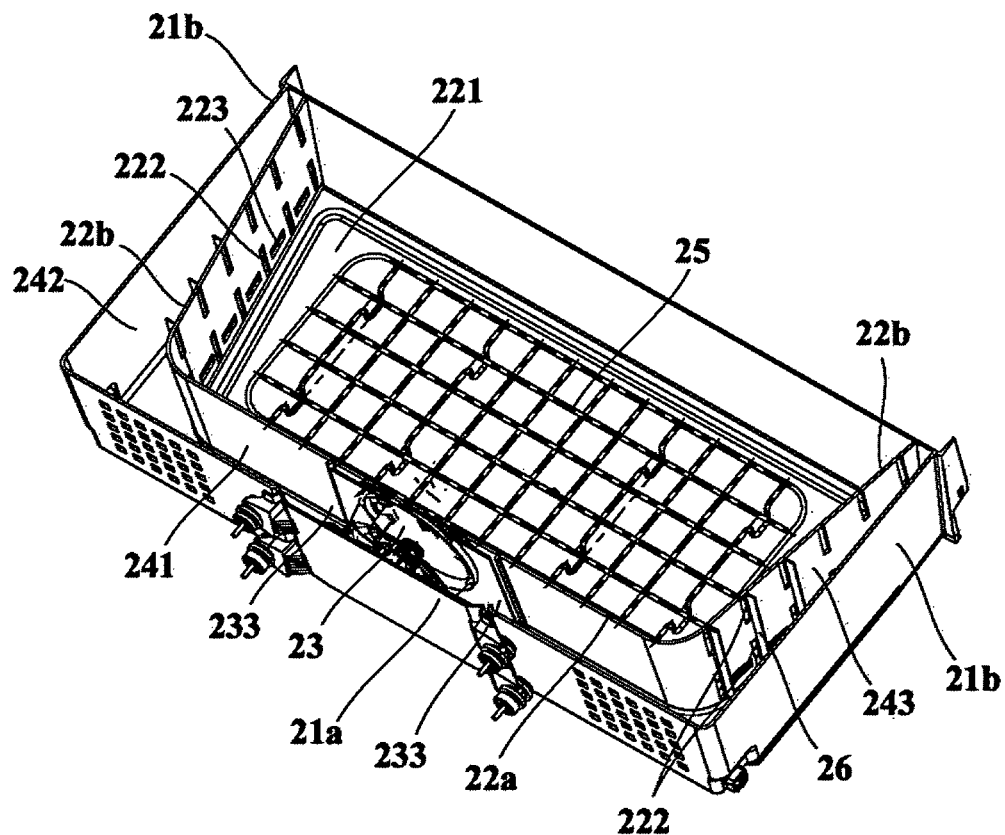

FIG. 1 is a schematic exploded view of the aging device according to an embodiment of the present application, FIGS. 2 and 3 are schematic cross-sectional views of the aging device in different orientations according to an embodiment of the present application. Referring to FIGS. 1 to 3, the aging device 20 for the refrigerating and freezing device comprises an outer housing 21, an inner housing 22, and a circulating fan 23.

The inner housing 22 defines an aging chamber 221 therein for accommodating objects to be aged. The outer housing 21 is disposed on an exterior of the inner housing 22, and at least part of a circumferential side wall of the outer housing 21 is spaced apart from at least part of a circumferential side wall of the inner housing 22 to form an air supply channel 24, and the air supply channel is located outside the inner housing 22 and inside the outer housing 21. The air supply channel 24 communicates with the aging chamber 221 through a plurality of air supply ports located on the circumferential side wall of the inner housing 22. The circulating fan 23 is configured to control the airflow in the air supply channel 24 through the air supply ports towards the aging chamber 221. The plurality of air supply ports are arranged in a sparse-top, dense-bottom manner on the circumferential side wall of the inner housing 22.

That is to say, the aging device 20 has a double-layer structure comprises the inner housing 22 and the outer housing 21, with the aging chamber 221 defined inside the inner housing 22, and the air supply channel 24 defined between the inner housing 22 and the outer housing 21. Driven by the circulating fan 23, the airflow within the air supply channel 24 is directed to the aging chamber 221 through air supply ports located on the circumferential side wall of the inner housing 22. Moreover, the air supply ports are arranged in a sparse-top, dense-bottom manner on the circumferential side wall of the inner housing 22, meaning that the air supply ports at the top are sparsely distributed, and those at the bottom are densely arranged, thereby allowing more airflow to flow into a lower part of the aging chamber 221, blowing towards the bottom of the objects to be aged, inhibiting microbial growth and reproduction, thereby preventing the objects from spoiling and deteriorating due to high bottom humidity.

Specifically, the plurality of air supply ports on the circumferential side wall of the inner housing 22 can be arranged into two rears of upper air supply ports and lower air supply ports, a ratio between the total area of the upper air supply ports and the total area of the lower air supply ports is preferably between 1:2 and 1:3, thereby reasonably distributing the airflow towards upper and lower areas of the aging chamber 221. On one hand, this can ensure a greater airflow speed in the lower area of the aging chamber 221 to accelerate the evaporation of moisture at a bottom portion of the objects to be aged, and on the other hand, it can ensure that other areas of the objects are also exposed to the airflow, thus achieving better aging results.

In some embodiments, the aging device 20 also includes a cylindrical body 20a, with the outer housing 21, inner housing 22, and circulating fan 23 forming an open-top drawer 20b that can be slidably set within the cylindrical body 20a, thereby forming a relatively enclosed aging chamber 221. This also facilitates the placement of objects to be aged into or removal from the aging chamber 221, enhancing the ease of operation for the user.

It is understandable that there are various specific arrangements of the air supply ports on the circumferential side wall of the inner housing 22.

Specifically, in some embodiments, multiple air supply ports include several vertically extending vertical air supply ports 222 and several horizontally extending horizontal air supply ports 223. That is, both vertical air supply ports 222 and horizontal air supply ports 223 are slot-shaped, which have a larger cross-sectional area, reducing the airflow resistance entering the aging chamber 221 and ensuring the speed of airflow directed at the objects to be aged. Moreover, the distribution of vertical air supply ports 222 and horizontal air supply ports 223 extending in different directions achieves uniform or targeted airflow throughout the aging chamber 221 in various directions.

Further, the height of the horizontal air supply ports 223 is positioned below the middle and above the bottom of the lowest row of vertical air supply ports 222. Thus, the airflow in the upper area of the aging chamber 221 is provided through the vertical air supply ports 222, and the airflow in the lower area of the aging chamber 221 is provided through both vertical air supply ports 222 and horizontal air supply ports 223, ensuring that the lower area of the aging chamber 221 receives more airflow than its upper area, thereby targeting airflow at the bottom of the objects to be aged.

Specifically, a plurality of vertical air supply ports 222 can be arranged in a single row or multiple rows. A plurality of horizontal air supply ports 223 are arranged in a single row.

In some embodiments, a grid placement rack 25 is provided inside the inner housing 22 for placing objects to be aged, spaced from the bottom plate of the inner housing 22, leaving space for airflow underneath the grid placement rack 25, which facilitates airflow directed at the underside of the objects placed on the grid placement rack 25, ensuring that the underside of the objects can quickly achieve a drying effect.

Specifically, the grid placement rack 25 has a plurality of perforated mesh holes, and the perforated design of the grid placement rack 25 also reduces the contact area between the objects to be aged and the grid placement rack 25, thereby avoiding parts of the objects' surface from spoiling due to lack of airflow contact.

Further, a height of the horizontal air supply ports 223 is approximately equal to or slightly lower than a height of the grid placement rack 25. Therefore, the airflow blown into the aging chamber 221 through the horizontal air supply ports 223 directly targets the bottom portion of the objects placed on the grid placement rack 25, thereby accelerating the aging process of the objects.

In some embodiments, a plurality of vertical air supply ports 222 and a plurality horizontal air supply ports 223 are alternately arranged. This arrangement ensures relatively uniform airflow distribution in the aging chamber 221 in a front-to-back direction.

Specifically, the vertical air supply ports 222 have a same size, and the horizontal air supply ports 223 have a same size. A distribution density of the vertical air supply ports 222 is balanced, a distribution density of the horizontal air supply ports 223 is also balanced, thereby ensuring uniform airflow in regions at a same height inside the aging chamber 221.

In some alternative embodiments, the plurality of air supply ports on the circumferential side wall of the inner housing 22 can also adopt other arrangements, such as uniform-sized circular air supply ports, with a lower density of circular air supply ports at the top and a higher density at the bottom.

In some embodiments, a rear wall 21a and two transverse side walls 21b of the outer housing 21 are spaced apart from a rear wall 22a and two transverse side walls 22b of the inner housing 22, respectively, forming the air supply channel 24 being of U-shaped. The circulating fan 23 is installed inside the air supply channel 24, the plurality of air supply ports are disposed on the two transverse side walls 22b of the inner housing 22. As a result, the airflow in the air supply channel 24 is directed to the aging chamber 221 through air supply ports located on the two transverse side walls 22b of the inner housing 22. That is, the airflow enters the aging chamber 221 simultaneously from both lateral sides, thereby enhancing the uniformity of airflow across the aging chamber 221, and improving the aging effects of the objects to be aged.

In some embodiments, the air supply channel 24 comprises a first air supply section 241 located behind the inner housing 22, a second air supply section 242 and a third air supply section 243 formed on the lateral sides of the inner housing 22. The circulating fan 23 is situated in the first air supply section 241, and a return air port 224 is provided on the rear wall of the inner housing 22. An air intake of the circulating fan 23 is communicated with the return air port 224, and two opposite air outlets 233 of the circulating fan 23 communicate with the second air supply section 242 and the third air supply section 243 respectively. Hence, the airflow entering the aging chamber 221 can travel a longer path in the aging chamber and exits through the return air port 224, thereby extending the time air blows over the surface of the objects to be aged, and effectively enhancing the air drying impact on these objects.

When the circulating fan 23 operates, the airflow inside the aging chamber 221 enters the circulating fan 23 through the return air port 224 and flows from the two opposite air outlets 233 of the circulating fan 23 towards the second air supply section 242 and the third air supply section 243. The airflow in the first and second air supply sections enters the aging chamber 221 through air supply ports located on the two transverse side walls 22b of the inner housing 22, thus achieving a circulating airflow between the air supply channel 24 and the aging chamber 221.

Furthermore, since the circulating fan 23 is positioned in the first air supply section 241 at a rear side, when the aging device 20 is placed in the refrigerating and freezing device 1, the circulating fan 23 is located at a rear side of the refrigerating and freezing device 1, thus the user is not easy to feel the noise generated when the circulating fan 23 is running.

Specifically, the circulating fan 23 is a single-inlet, dual-outlet centrifugal fan. Therefore, it not only directs airflow from the return air port 224 simultaneously towards two opposing directions into two air supply channels 24 but also minimizes the space occupied by the circulating fan 23, thereby making the structure of the aging device 20 more compact and smaller, and avoiding excessive space occupation inside the refrigerating and freezing device 1.

In some embodiments, both the second air supply section 242 and the third air supply section 243 are tapered along the direction of airflow within them. Specifically, the airflow direction in both the second air supply section 242 and the third air supply section 243 is from back to front, and the cross-sectional area of the second air supply section 242 and the third air supply section 243 gradually decreases from back to front. This tapering helps maintain a consistent airflow speed throughout the second air supply section 242 and the third air supply section 243, thereby improving the uniformity of airflow distribution along the longitudinal axis of the aging chamber 221 and ensuring uniform airflow impact on the surface of the objects to be aged in all areas along this axis.

It is evident that the objects to be aged receive uniform airflow delivery both horizontally and longitudinally (i.e., front-and-back), thereby enhancing the aging results of the objects.

The applicant has recognized that the airflow speed is initially high when entering the second air supply section 242 and the third air supply section 243, leading to a reduced intake of airflow at the air supply ports connected upstream to the second air supply section 242 and third air supply section 243. This results in a lower volume of airflow at a rear area of the aging chamber 221.

To address this, in some embodiments, guide plates 26 are provided upstream of the second air supply section 242 and the third air supply section 243, and the guide plates 26 are located adjacent to some air supply ports on the outer side. That is, the guide plates 26 are positioned in the air supply channel 24 and can block part of the airflow within the duct, directing this portion of the airflow towards the respective air supply ports. This arrangement ensures sufficient airflow at the upstream air supply ports, thereby enhancing the uniformity of airflow in the front-to-back direction within the aging chamber 221, and improving the aging effect.

Specifically, the guide plates 26 extend from the outside of the air supply ports vertically towards the interior of the air supply channel 24 in a direction perpendicular to the transverse side walls of the inner housing 22. The extension length of the guide plates does not exceed one-third of the width of their position in the air supply channel 24, ensuring more airflow moves towards the downstream side of the air supply channel 24.

In some alternative embodiments, the guide plates 26 also extend from the outside of the air supply ports into the air supply channel 24 at an angle, oriented such that the leading edge of the guide plates forms an acute angle with the transverse side walls of the inner housing 22, thereby enhancing the ability of the guide plates 26 to capture airflow.

In some embodiments, the return air port 224 is a circular air port, a center of the return air port 224 coincides with a center of the circulating fan 23, and a diameter of the return air port 224 is ¾ to 1 times a diameter of the circulating fan 23. This means that the return air port 224 can be slightly smaller than or equal to the diameter of the circulating fan 23, but does not exceed it. This design ensures smooth return airflow without affecting the volume of air, and avoids the issue of part of the airflow being suctioned back through the return air port 224 without passing through the air supply channel, thereby not impacting the airflow volume.

In some embodiments, a height of the air outlets 233 of the circulating fan 23 is ⅔ to 5/3 of the diameter of the circulating fan 23. This prevents issues where too low an outlet height could cause high resistance to airflow output, thereby impacting the volume of air, and too high an outlet height does not enhance air volume but increases structural dimensions, causing the aging device 20 to occupy more space.

Figure 4:
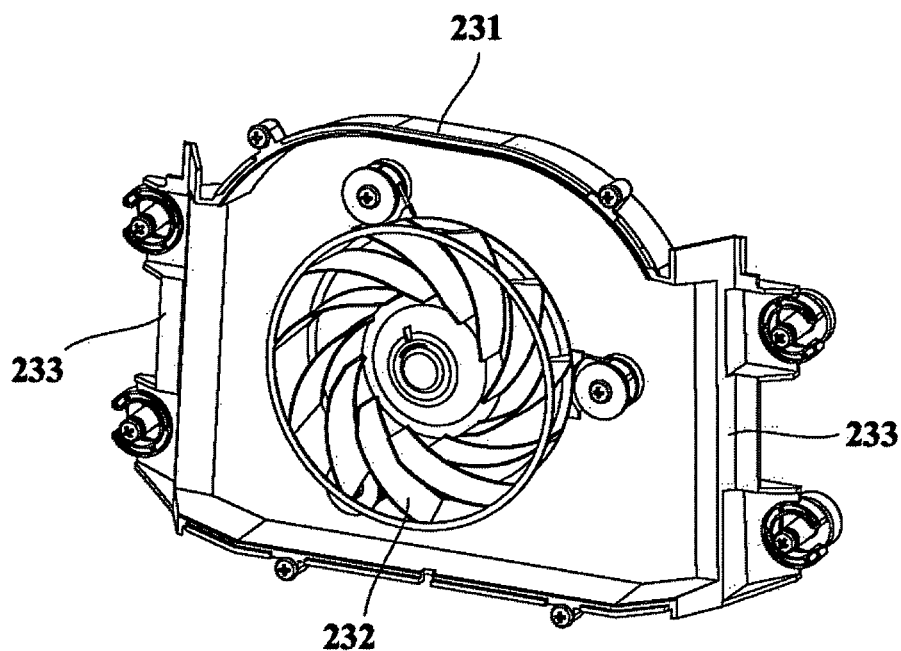
FIG. 4 is a schematic structural view of an internal structure of a circulating fan according to an embodiment of the present application.

FIG. 4 is a schematic structural diagram of the internal structure of a circulating fan according to an embodiment of the application. In some embodiments, the circulating fan 23 comprises a volute 231 and an impeller 232 located in the volute 231. A top portion of the volute 231 is an upwardly protruding arc-shaped structure. This means that the top portion inside the volute 231 forms an arc-shaped guide structure, which directs the airflow towards two air outlets 233 on the lateral sides, thereby reducing airflow resistance and the loss of air volume.

Furthermore, a base of the circulating fan 23 is either flat or has a downwardly concave arc-shaped structure, with the degree of concavity at the base being less than the degree of protrusion at a top portion of the circulating fan, in order to minimize the space occupied by the circulating fan 23 as much as possible.

Figure 5:
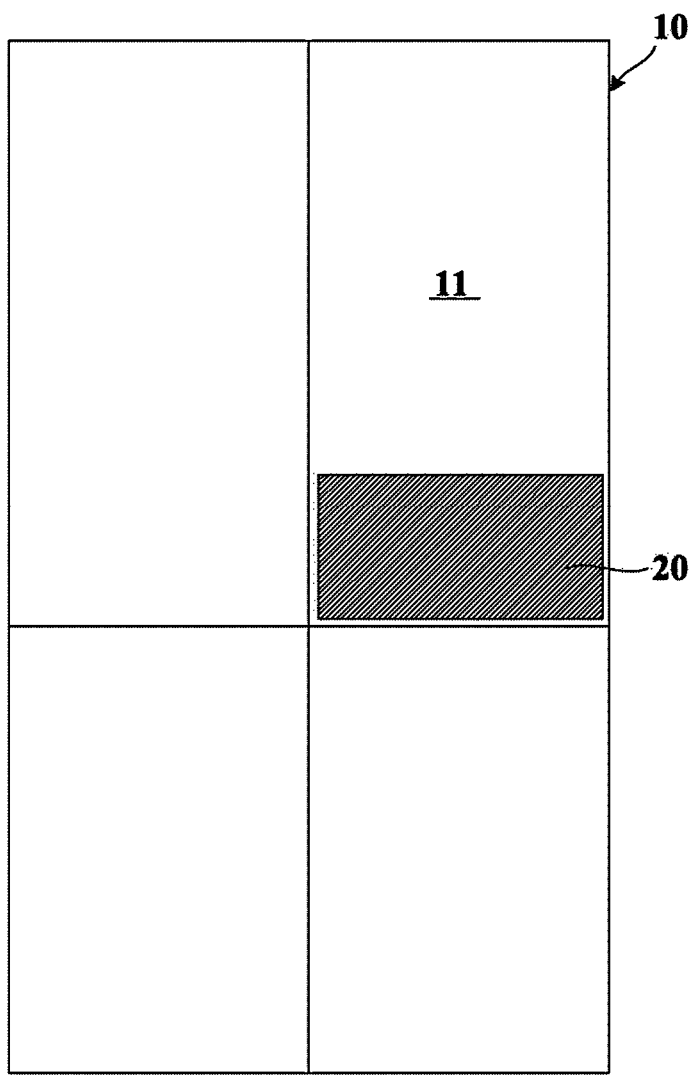
FIG. 5 is a schematic structural view of a refrigerating and freezing device according to an embodiment of the present application.

The application further provides a refrigerating and freezing device, as shown in FIG. 5, which is a schematic structural diagram of the refrigerating and freezing device according to an embodiment of the application. The refrigerating and freezing device 1 comprises a cabinet 10 that defines a storage chamber 11 for storing objects. Specifically, the refrigerating and freezing device 1 comprises the aging device 20 described in any of the embodiments above, which is used for aging objects within it, and is located in the storage chamber 11. The refrigerating and freezing device 1 integrated with the aging device 20 not only maintains the traditional function of preserving objects in a low-temperature environment but also offers aging capabilities, thereby enhancing the functionality of the refrigerating and freezing device 1.

Further, the storage chamber 11 can maintain a storage temperature range of 0 to 8° C., which is suitable for the temperature requirements of objects to be aged. Additionally, the humidity in the storage chamber is usually higher than that of the ambient indoor environment, suitable for the humidity requirements of the objects to be aged. Even if the humidity inside the aging device 20 is not ideal, it can be easily adjusted through the airflow within the storage chamber. Therefore, placing the aging device 20 in the storage chamber allows full utilization of the inherent temperature and humidity conditions of the storage chamber, thereby minimizing costs.

Moreover, the cabinet 10 further define a freezer compartment and/or a variable temperature compartment. The storage chamber, freezer compartment, and variable temperature compartment are accessed through doors that can pivotally open or close, located on the front of the cabinet 10.

Those skilled in the art should understand that the refrigerating and freezing device 1 can be a cross door refrigerator, with the aging device 20 located in one of upper storage chambers.

In other embodiments, the refrigerating and freezing device 1 is not limited to the refrigerator structure shown in FIG. 5, it can also be a double-door refrigerator, with the aging device 20 located in one of the upper refrigerating chambers.

In other embodiments, the refrigerating and freezing device 1 is not limited to the refrigerator structure shown in FIG. 5, it can also be a three-door refrigerator, and the aging device 20 is located in one of the upper refrigerating chambers.

In other embodiments, the refrigerating and freezing device 1 is not limited to the refrigerator structure shown in FIG. 5, it can also be a side-by-side refrigerator, and the aging device 20 is located in a chamber that has a refrigerated storage environment.

Technical terms such as "upper", "lower", "front", "back", "top" and "bottom" used in the descriptions of embodiments are based on the actual operational orientation of the aging device 20 and the refrigerating and freezing device 1. These terms are used merely for the ease of description and understanding of the technical solutions of the application and do not indicate or imply that the devices or components must have specific orientations or be constructed and operated in a particular orientation, and thus should not be construed as limiting the application.

So far, it should be appreciated by those skilled in the art that while various exemplary embodiments of the application have been shown and described in detail herein, many other variations or modifications which are consistent with the principles of this application may be determined or derived directly from the disclosure of the present application without departing from the spirit and scope of the application. Accordingly, the scope of the application should be understood and interpreted to cover all such other variations or modifications.

What is claimed is:

1. An aging device for a refrigerating and freezing device, for aging objects to be aged therein, comprising:
   an inner housing, defining an aging chamber inside for accommodating objects to be aged;
   an outer housing, disposed outside the inner housing, wherein at least part of a circumferential side wall of the outer housing is spaced apart from at least part of a circumferential side wall of the inner housing to form an air supply channel located outside the inner housing and inside the outer housing, the air supply channel communicates with the aging chamber through a plurality of air supply ports disposed in the circumferential side wall of the inner housing; and
   a circulating fan, configured to controllably drive airflow in the air supply channel through the air supply ports towards the aging chamber; wherein
   the plurality of air supply ports are arranged on the circumferential side wall of the inner housing in a manner of becoming gradually dense from top to bottom.

2. The aging device according to claim 1, wherein the air supply ports comprise several vertical air supply ports extending vertically and several horizontal air supply ports extending horizontally; and the horizontal air supply ports are positioned in height below a middle portion and above a bottom portion of the lowest row of the vertical air supply ports.

3. The aging device according to claim 2, wherein a grid placement rack is provided inside the inner housing for placing objects to be aged, the grid placement rack is spaced apart from a bottom plate of the inner housing; and a height of the horizontal air supply ports is approximately equal to or slightly lower than a height of the grid placement rack.

4. The aging device according to claim 1, wherein a rear wall and two transverse side walls of the outer housing, and a rear wall and two transverse side walls of the inner housing are spaced apart respectively, to form the air supply channel being of U-shaped; the circulating fan is positioned in the air supply channel, and the plurality of air supply ports are defined on the two transverse side walls of the inner housing.

5. The aging device according to claim 4, wherein the air supply channel comprises a first air supply section located behind the inner housing, a second air supply section and a third air supply section respectively formed on lateral sides of the inner housing;
   the circulating fan is located in the first air supply section, a return air port is provided on the rear wall of the inner housing, an air intake of the circulating fan is communicated with the return air port, and two opposite air outlets of the circulating fan are communicated with the second air supply section and the third air supply section.

6. The aging device according to claim 5, wherein the second air supply section and the third air supply section are tapered along a direction of airflow inside them.

7. The aging device according to claim 5, wherein guide plates are provided upstream of the second air supply section and the third air supply section, and the guide plates are located adjacent to some of the air supply ports on the outside.

8. The aging device according to claim 5, wherein the return air port is a circular air port, a center of the return air port coincides with a center of the circulating fan, and a diameter of the return air port is ¾ to 1 times a diameter of the circulating fan; and/or
   a height of the air outlets of the circulating fan is ⅔ to 5/3 of the diameter of the circulating fan.

9. The aging device according to claim 1, wherein the circulating fan comprises a volute and an impeller positioned in the volute, a top portion of the volute is an upwardly protruding arc-shaped structure.

10. A refrigerating and freezing device, comprising:
   a cabinet, which defines a storage chamber for storing objects; and
   the aging devices according to claim 1, for aging objects therein, the aging device being positioned in the storage chamber.

* * * * *